United States Patent
Kim et al.

(10) Patent No.: US 11,654,920 B2
(45) Date of Patent: May 23, 2023

(54) INTEGRATED CONTROL APPARATUS OF A VEHICLE, SYSTEM HAVING THE SAME AND METHOD THEREOF

(71) Applicants: HYUNDAI MOTOR COMPANY, Seoul (KR); KIA MOTORS CORPORATION, Seoul (KR)

(72) Inventors: Hyun Su Kim, Uiwang-si (KR); Min Ji Chae, Incheon (KR); Jae Sung Cho, Suwon-si (KR); Min Je Hyun, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 154 days.

(21) Appl. No.: 17/030,933

(22) Filed: Sep. 24, 2020

(65) Prior Publication Data
US 2021/0370951 A1 Dec. 2, 2021

(30) Foreign Application Priority Data
May 27, 2020 (KR) .................. 10-2020-0063811

(51) Int. Cl.
*B60W 40/08* (2012.01)
*B60W 10/18* (2012.01)
(Continued)

(52) U.S. Cl.
CPC ............ *B60W 40/08* (2013.01); *B60W 10/18* (2013.01); *B60W 10/22* (2013.01); *B60W 30/02* (2013.01);
(Continued)

(58) Field of Classification Search
CPC ...... B60W 40/08; B60W 10/18; B60W 10/22; B60W 30/02; B60W 40/109;
(Continued)

(56) References Cited

U.S. PATENT DOCUMENTS 5,497,324 A * 3/1996 Henry ................ B60G 17/0157
280/5.503
6,502,023 B1 * 12/2002 Fukada .............. B60G 17/0162
701/72

(Continued)

FOREIGN PATENT DOCUMENTS

JP 3324346 B2 7/2002
JP 4596112 B2 10/2010

*Primary Examiner* — Nicholas Kiswanto
*Assistant Examiner* — Jamal A Shah
(74) *Attorney, Agent, or Firm* — Morgan, Lewis & Bockius LLP

(57) ABSTRACT

The present disclosure relates to an integrated control apparatus for a vehicle, a system including the same, and a method thereof, and an exemplary embodiment of the present disclosure provides an integrated control apparatus for a vehicle, including: a processor configured to perform braking control in an initial stage of steering control of a driver, to control a damping force of an electronic controlled suspension, to release the braking control in a later stage of steering control of the driver, and to increase the damping force of the electronic controlled suspension; and a storage configured to store data obtained by the processor and an algorithm for driving the processor.

19 Claims, 14 Drawing Sheets

(51) Int. Cl.
  *B60W 10/22* (2006.01)
  *B60W 30/02* (2012.01)
  *B60W 40/109* (2012.01)
  *B60W 40/114* (2012.01)
  *B60W 40/112* (2012.01)
  *B60W 40/12* (2012.01)

(52) U.S. Cl.
  CPC ........ *B60W 40/109* (2013.01); *B60W 40/112* (2013.01); *B60W 40/114* (2013.01); *B60W 40/12* (2013.01); *B60W 2520/125* (2013.01); *B60W 2520/14* (2013.01); *B60W 2520/18* (2013.01); *B60W 2540/18* (2013.01)

(58) Field of Classification Search
  CPC .. B60W 40/112; B60W 40/114; B60W 40/12; B60W 2520/125; B60W 2520/14; B60W 2520/18; B60W 2540/18
  See application file for complete search history.

(56) References Cited

U.S. PATENT DOCUMENTS

| | | | |
|---|---|---|---|
| 2002/0091479 A1* | 7/2002 | Maruko | B60T 7/22 701/96 |
| 2010/0268419 A1* | 10/2010 | Yasui | B60T 8/1755 701/41 |
| 2013/0079988 A1* | 3/2013 | Hirao | B60W 10/184 701/38 |
| 2017/0203756 A1* | 7/2017 | Cotgrove | B60W 10/18 |
| 2019/0016188 A1* | 1/2019 | Hachisuka | B60G 17/016 |
| 2019/0126711 A1* | 5/2019 | Giovanardi | B60G 17/0161 |
| 2019/0270444 A1* | 9/2019 | Park | B60W 10/10 |

* cited by examiner

<FLOOR VIEW>

<FRONT VIEW>

INTEGRATED CONTROL APPARATUS OF A VEHICLE, SYSTEM HAVING THE SAME AND METHOD THEREOF

CROSS-REFERENCE TO RELATED APPLICATION

The present application claims the benefit of priority to Korean Patent Application No. 10-2020-0063811, filed on May 27, 2020 in the Korean Intellectual Property Office, the entire disclosure of which is incorporated herein by reference.

TECHNICAL FIELD

The present disclosure relates to an integrated control apparatus for a vehicle, a system including the same, and a method thereof, and more particularly, to a technique capable of improving a sense of steering unity and linearity of a vehicle behavior.

BACKGROUND

In the case of conventional braking control for yaw rate control, yaw gain control is performed to increase a magnitude of the yaw rate. Conversely, in the case of electronic controlled suspension control, control is performed to reduce a size of a roll.

In a conventional art, a delay time between the yaw rate and the roll is increased by performing control for increasing the yaw rate and control for decreasing the roll when controlling the yaw rate and the roll.

When the delay time between the yaw rate and the roll is increased, there is a problem in that the control is operated in a direction that decreases a sense of unity of a vehicle behavior.

The above information disclosed in this Background section is to aid in the understanding of the background of the present disclosure, and should not be taken as acknowledgement that this information forms any part of prior art.

SUMMARY

An exemplary embodiment of the present disclosure has been made in an effort to provide an integrated control apparatus for a vehicle, a system including the same, and a method thereof, capable of improving responsibility between a raw rate and a roll by dividing a time when a steering of a vehicle is controlled into an initial steering stage and a later steering stage and integrally controlling braking control and electronic controlled suspension control.

The technical objects of the present disclosure are not limited to the objects mentioned above, and other technical objects not mentioned can be clearly understood by those skilled in the art from the description of the claims. According to an exemplary embodiment of the present disclosure, an integrated control apparatus for a vehicle may include: a processor configured to perform braking control in an initial stage of steering control of a driver, to control a damping force of an electronic controlled suspension, to release the braking control in a later stage of steering control of the driver, and to increase the damping force of the electronic controlled suspension; and a storage configured to store data obtained by the processor and an algorithm for driving the processor.

In an exemplary embodiment, the processor may control a phase difference between a yaw rate and a roll angle when controlling the braking control and the electronic controlled suspension.

In an exemplary embodiment, the processor may estimate a roll angle of the vehicle based on a lateral acceleration of the vehicle and a mass of the vehicle.

In an exemplary embodiment, the processor may calculate a target yaw rate and a target roll angle based on a three-degree-of-freedom vehicle model. In an exemplary embodiment, the processor may calculate a yaw rate error based on the target yaw rate and a sensed yaw rate.

In an exemplary embodiment, the processor may calculate a roll angle error based on the target roll angle and an estimated roll angle.

In an exemplary embodiment, the processor may calculate a target yaw moment based on the yaw rate error, and may calculate a target roll moment based on the roll angle error.

In an exemplary embodiment, the processor may converts the target yaw moment into a target braking pressure, and may convert the target roll moment into a target damping amount.

In an exemplary embodiment, the processor may output the target braking pressure to a braking control device, and may output the target damping amount to an electronic controlled suspension system.

In an exemplary embodiment, the processor may convert the target yaw moment into a tire force, and may convert the tire force into a target braking pressure.

In an exemplary embodiment, the processor may calculate a target damping force applied to each wheel of the vehicle by using at least one of a front wheel distribution ratio, a rear wheel distribution ratio, or a left and right distribution ratio.

In an exemplary embodiment, the processor may perform braking control during a period in which a yaw rate is generated and increases in an initial stage of steering control of the vehicle, and may control the braking control to be ended in a later stage of steering control.

In an exemplary embodiment, the processor may control a damping force of a first stage to be outputted before a roll angle occurs in the initial stage of steering control of the vehicle, may control a damping force of a second stage that is larger than the first stage to be outputted at a time point at which a change amount of the roll angle decreases after the roll angle increases, and releases damping control when a roll rate disappears.

In an exemplary embodiment, the processor may control the yaw rate by performing eccentric braking on the turning inner rear wheel in the initial stage of steering control of the vehicle, may control the damping force for damping control, and may release the eccentric braking in the later stage of steering the vehicle to increase the damping force.

In an exemplary embodiment, the processor may determine a willingness of the driver to accelerate based on a vehicle speed and a driver accelerator pedal opening degree (APS), and may determine a willingness of the driver to turn based on a steering angle and a steering angle speed.

An exemplary embodiment of the present disclosure provides a vehicle system including: a braking control device configured to control braking of a vehicle; an electronic controlled suspension system configured to control a posture of a vehicle body; and an integrated control apparatus configured to integrally control the braking control device and the electronic controlled suspension system, wherein the integrated control apparatus performs braking control in an initial stage of steering control of a driver, controls a damping force of an electronic controlled suspension, releases braking control in a later stage of steering control of the driver, and increases a damping force of the electronic controlled suspension.

In an exemplary embodiment, the braking control 400 may include an electronic stability control (ESC) device.

An exemplary embodiment of the present disclosure provides an integrated control method for a vehicle, including: performing braking control in an initial stage of steering control of a driver, and controlling a damping force of an electronic controlled suspension; and releasing braking control in a later stage of steering control of the driver, and increasing a damping force of the electronic controlled suspension.

In an exemplary embodiment, the method may further include estimating a roll angle of the vehicle based on a lateral acceleration of the vehicle and a mass of the vehicle; calculating a target yaw rate and a target roll angle based on a three-degree-of-freedom vehicle model; calculating a yaw rate error based on the target yaw rate and a sensed yaw rate; and calculating a roll angle error based on the target roll angle and an estimated roll angle.

In an exemplary embodiment, the method may further include calculating a target yaw moment based on the yaw rate error; calculating a target roll moment based on the roll angle error; converting the target yaw moment into a target braking pressure; and converting the target roll moment into a target damping amount.

In an exemplary embodiment, the method may further include outputting the target braking pressure to a braking control device; and outputting the target damping amount to an electronic controlled suspension system.

According to the present technique, responsibility between a raw rate and a roll may be improved by dividing a time when a steering of a vehicle is distinguished into an initial steering stage and a later steering stage and integrally controlling braking control and electronic controlled suspension control, thereby enhancing unity and linearity of a vehicle behavior.

In addition, various effects that can be directly or indirectly identified through this document may be provided.

DETAILED DESCRIPTION OF THE EMBODIMENTS

Figure 1:
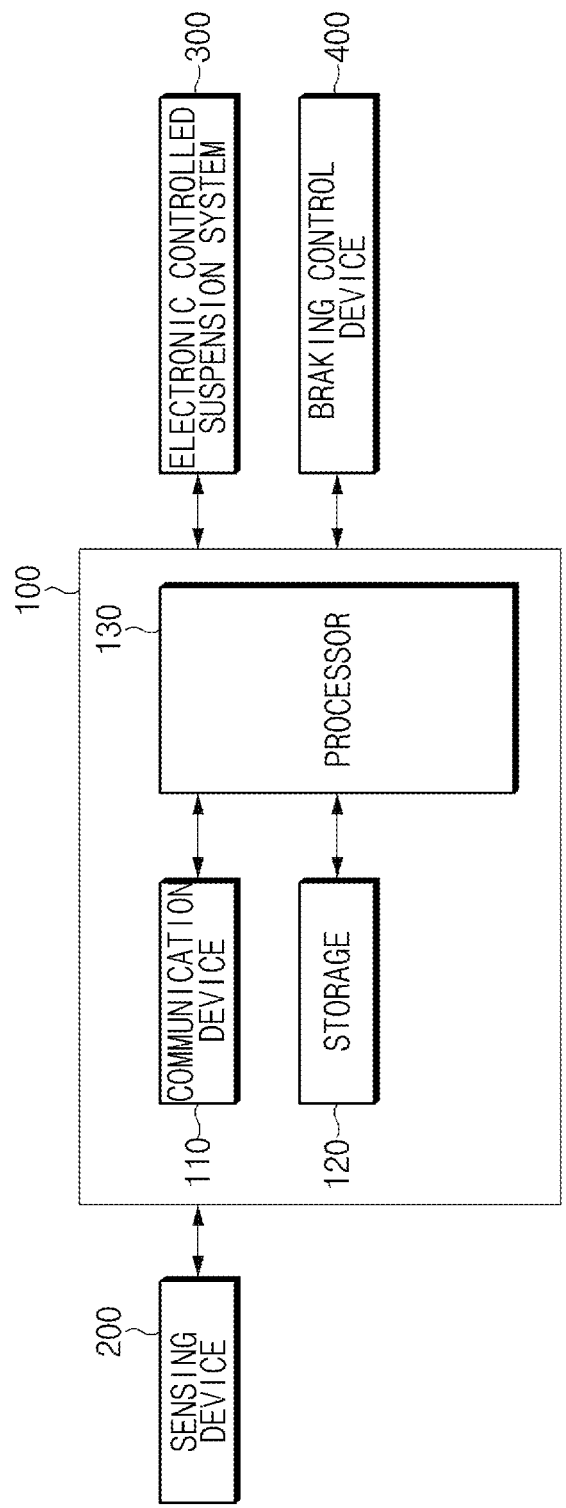
FIG. 1 illustrates a block diagram showing a configuration of a vehicle system including an integrated control apparatus for a vehicle according to an exemplary embodiment of the present disclosure.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIG. 1 to FIG. 12.

FIG. 1 illustrates a block diagram showing a configuration of a vehicle system including an integrated control apparatus for a vehicle according to an exemplary embodiment of the present disclosure.

Referring to FIG. 1, according to an exemplary embodiment of the present disclosure, the integrated control apparatus 100 for the vehicle may be implemented inside the vehicle. In this case, the integrated control apparatus 100 may be integrally formed with internal control units of the vehicle, or may be implemented as a separate device to be connected to control units of the vehicle by a separate connection means.

Figure 2:
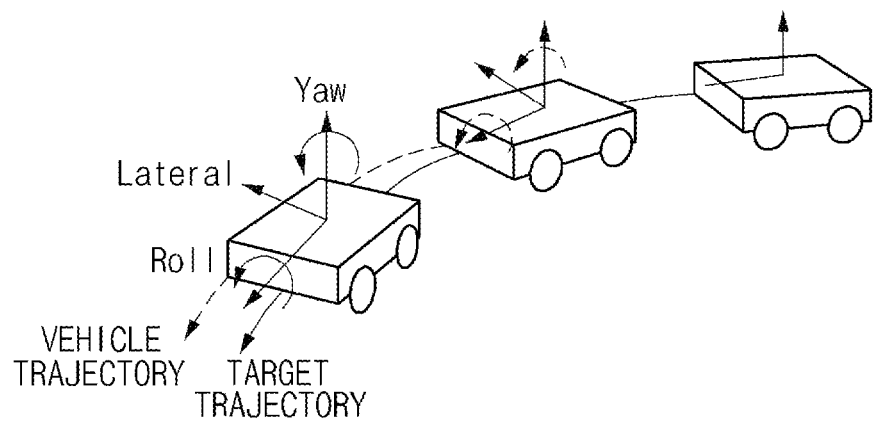
FIG. 2 illustrates a movement direction during vehicle integrated control according to an exemplary embodiment of the present disclosure.

Referring to FIG. 2, a vehicle system may include the integrated control apparatus 100, a sensing device 200, an electronic controlled suspension system, and a braking control device 400.

The integrated control apparatus 100 determines an intention to turn based on a sensing signal received from the sensing device 200 (e.g., a steering angle of a driver, an accelerator pedal signal, etc.), estimates vehicle conditions such as a vehicle speed and a roll angle, calculates target values for yaw and roll behaviors of the vehicle, and calculates and outputs control values for controlling the electronic controlled suspension system 300 and the braking control device 400.

The integrated control apparatus 100 may include a communication device 110, a storage 120, and a processor 130.

The communication device 110, which is a hardware device implemented with various electronic circuits to transmit and receive signals through a wireless or wired connection, may perform V2I communication by using an in-vehicle network communication technique or a wireless Internet access or short range communication technique with servers, infrastructure, and other vehicles outside the vehicle in the present disclosure. Herein, in-vehicle communication may be performed through controller area network (CAN) communication, local interconnect network (LIN) communication, or flex-ray communication as the in-vehicle network communication technique. In addition, the wireless communication technique may include wireless LAN (WLAN), wireless broadband (WiBro), Wi-Fi, world Interoperability for microwave access (WiMAX), etc. In addition, short-range communication technique may include Bluetooth, ZigBee, ultra wideband (UWB), radio frequency identification (RFID), infrared data association (IrDA), and the like.

As an example, the communication device 110 may receive a sensing result of the sensing device 200, and may receive vehicle information (e.g., a vehicle speed, a steering angle, a steering angle speed, etc.) from an in-vehicle device.

The storage 120 may store sensing results of the sensing device 200, vehicle information (e.g., lateral slip, etc.) received from devices in the vehicle by the communication device 110, data obtained by the processor 130, data and/or algorithms necessary for the vehicle integrated control apparatus 100 to operate, and the like.

As an example, the storage unit 120 may store a target yaw rate, a target roll angle, a target yaw moment, a target roll moment, and the like calculated by the processor 130, and data necessary for calculating the target yaw rate, the target roll angle, the target yaw moment, the target roll moment, and the like by the processor 130. The storage 120 may include a storage medium of at least one type among memories of types such as a flash memory, a hard disk, a micro, a card (e.g., an secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, or an optical disk.

The processor 130 may be electrically connected to the communication device 110, the storage 120, and the like, may electrically control each component, and may be an electrical circuit that executes software commands, thereby performing various data processing and calculations described below. The processor 130 may be, e.g., an electronic control unit (ECU), a micro controller unit (MCU), or other subcontrollers mounted in the vehicle.

The processor 130 according to an exemplary embodiment of the present disclosure may be e.g., a computer, a microprocessor, a CPU, an ASIC, a circuitry, logic circuits, etc.

The processor 130 may perform braking control in an initial stage of steering control of a driver, may weakly control a damping force of an electronic controlled suspension, may release the braking control in a later stage of steering control of the driver, and may hardly control the damping force of the electronic controlled suspension. For example, the damping force controlled in the later stage of steering control (i.e., weakly controlled damping force) may be greater than the damping force controlled in the initial stage of steering control (i.e., hardly controlled damping force). That is, the damping force may be increased in the later stage of steering control from the amount of damping force in the initial stage of steering control.

The processor 130 performs signal processing on various signals received from the sensing device 200 and the device in the vehicle. In this case, various signals may include a steering angle, a yaw rate, a vehicle speed, a lateral acceleration, an APS (driver accelerator pedal opening degree), a steering angular speed, etc., and the signal processing may include noise removal.

The processor 130 determines a driver intention based on the vehicle speed, the APS, the steering angle, and the steering angle speed. In this case, the driver intention may include a willingness to turn and a willingness to accelerate.

The processor 130 may determine that the driver is willing to accelerate when the vehicle speed exceeds a certain speed and the APS (driver accelerator pedal opening degree) exceeds a certain value, and may determine that the driver is willing to turn when the steering angle exceeds a certain value and the steering angle speed exceeds a certain value.

The processor 130 may estimate a roll angle as shown in Equation 1 below.

$$\phi_e = \frac{m_s a_y h_s}{K_j} \quad \text{(Equation 1)}$$

In Equation 1, $M_s$ indicates a mass of sprung mass, $h_s$ indicates a vertical distance from a road surface to a center of the mass of the sprung mass, $K_j$ indicates a roll stiffness coefficient of the vehicle, and $a_y$ indicates a lateral acceleration of the vehicle. These values may be obtained by receiving from the sensing device 200 or from the in-vehicle device through the communication device 110.

Figure 3A:
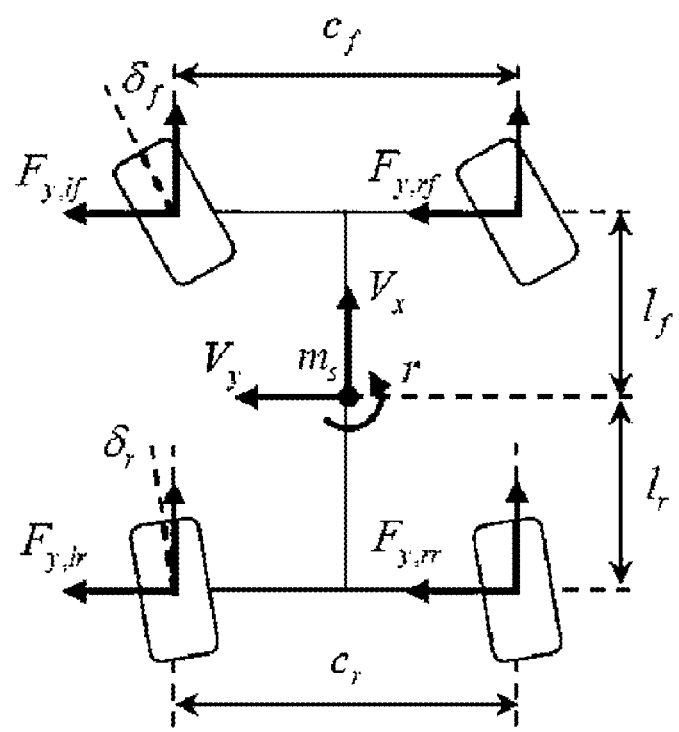
FIG. 3A and FIG. 3B illustrate a vehicle model for setting target values for controlling a roll and a yaw of an integrated control apparatus for a vehicle according to an exemplary embodiment of the present disclosure.
Figure 3B:
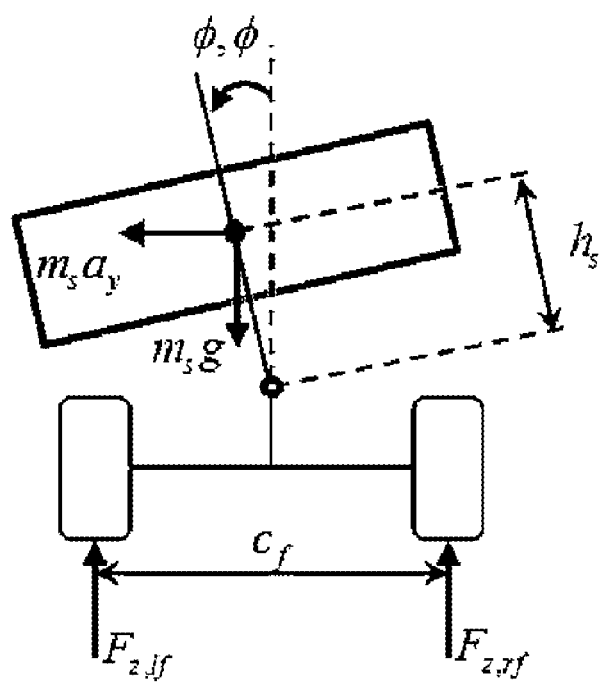

The processor 130 may use a three-degree-of-freedom model equation to calculate a target yaw rate and a target roll angle as control targets. FIG. 2 illustrates a movement direction during vehicle integrated control according to an exemplary embodiment of the present disclosure, and FIG. 3A and FIG. 3B illustrate a vehicle model for setting target values for controlling a roll and a yaw of an integrated control apparatus for a vehicle according to an exemplary embodiment of the present disclosure. FIG. 3A illustrates a top plan view of the vehicle, and FIG. 3B illustrates a front view thereof.

Referring to FIG. 2, the integrated control apparatus 100 may control a roll of the vehicle through control of the electronic controlled suspension system (ECS) 300, and may control a yaw of the vehicle through control of the braking control device (for example, ESC) 400.

The processor 130 may express the vehicle model as a three-degree-of-freedom vehicle model as in Equation 2 below.

1) Lateral direction: $mV_x(\dot{\beta}+r)=\Sigma F_{y,ij}+(m_{ur}l_r-m_{uf}l_f)\dot{r}+m_s h_2 \ddot{\phi}$ 2) Yaw direction: $I_{xz}\dot{r}=\Sigma M_z+(m_{ur}l_r-m_{uf}l_f)V_x(\dot{\beta}+r)+I_{x2}\ddot{\phi}$ 3) Roll direction: $I_{xx}\ddot{\phi}=m_2 g h_s \phi - k_\phi \phi - b_\phi \dot{\phi}+m_s h_z V_x(\dot{\beta}+r)+I_{x2}\dot{r}$ (Equation 2)

Referring to FIG. 3A and FIG. 3B, $F_{y,ij}$ indicates a lateral force applied to each tire FL, FR, RL, and RR, $M_{ur}$ indicates a mass of unsprung mass of a rear wheel, $M_{uf}$ indicates a mass of unsprung mass of a front wheel, $m_s$ indicates a mass of sprung mass, g indicates gravity acceleration, $h_s$ indicates a vertical distance from a road surface to a mass center of the mass, $I_r$ indicates a distance from a center of a rear axle to a C.G (center of gravity) point of the vehicle, and $I_f$ indicates a distance from a center of a front axle to a C.G (center of gravity) point of the vehicle. In addition, $I_{xz}$ indicates a yaw moment of inertia caused by a roll-direction movement, φ indicates a roll angle of the vehicle, r indicates a yaw rate of the vehicle, $V_x$ indicates a longitudinal speed of the vehicle, $M_z$ indicates a yaw moment based on a Z axis, β indicates a slip angle of the vehicle, $K_φ$ indicates a roll stiffness coefficient of the vehicle, and $b_φ$ indicates a roll damping coefficient of the vehicle.

The processor 130 may calculate the target yaw rate and the target roll angle by using a steady state variable Xss as shown in Equation 3 below.

$$Xss = -A_{ss}^{-1} B_{ss} u$$

$$X_{ss} = [β r φ]^T$$

$$u = [δ_f δ_r]^T \quad \text{(Equation 3)}$$

$δ_f$ indicates a front wheel steering angle (tire angle) of a vehicle, $δ_r$ indicates a rear wheel steering angle (tire angle) of the vehicle, and u indicates a matrix of the front and rear steering angles of the vehicle. The steady state variable Xss is calculated by using A matrix, B matrix and u matrix of Equation 4 below, r indicates the target yaw rate, and j indicates the target roll angle. Equations 5 and 6 define each matrix value in Equation 4.

$$A_{ss} = \begin{bmatrix} a_{11} & a_{12} & a_{13} \\ a_{21} & a_{22} & a_{23} \\ a_{41} & a_{42} & a_{43} \end{bmatrix}, B_{ss} = \begin{bmatrix} b_{11} & b_{12} \\ b_{21} & b_{22} \\ b_{41} & b_{42} \end{bmatrix} \quad \text{(Equation 4)}$$

$$a_{11} = -\frac{2C_f I_{xx} + 2C_r I_{xx}}{I_{xx} m V_x - m_s^2 h_s^2 V_x} \quad \text{(Equation 5)}$$

$$a_{12} = -1 - \frac{2C_f l_f I_{xx} + 2C_r l_r I_{xx}}{I_{xx} m V_x^2 - m_s^2 h_s^2 V_x^2}$$

$$a_{13} = \frac{m_s^2 g h_s^2 - m_s h_s k_φ + \left(2C_f I_{xx} \frac{\partial δ_{fφ}}{\partial φ} + 2C_r I_{xx} \frac{\partial δ_{φr}}{\partial φ}\right)}{I_{xx} m V_x - m_s^2 h_s^2 V_x}$$

$$a_{21} = -\frac{2C_f l_f - 2C_r l_r}{I_{zz}}$$

$$a_{22} = -\frac{2C_f l_f^2 - 2C_r l_r^2}{I_{zz} V_x}$$

$$a_{23} = 2\frac{C_f l_f}{I_{zz}} \frac{\partial δ_{fφ}}{\partial φ} - 2\frac{C_r l_r}{I_{zz}} \frac{\partial δ_{φr}}{\partial φ}$$

$$a_{41} = -\frac{(2C_f + 2C_r) m_z h_s}{m I_{xx} - m_1^2 h_s^2}$$

$$a_{42} = -\frac{(2C_f l_f + 2C_r l_r) m_z h_s}{m I_{xx} V_x - m_1^2 h_s^2 V_x}$$

$$a_{43} = \frac{(m_z g h_s - k_φ) m + m_s h_s \left(2C_f \frac{φ δ_{fφ}}{\partial φ} + 2C_r \frac{\partial δ_φ}{\partial φ}\right)}{m I_{xx} - m_s^2 h_s^2}$$

$$b_{11} = \frac{2I_{xx} C_f}{I_{xx} m V_x - m_s^2 h_s^2 V_x} \quad \text{(Equation 6)}$$

$$b_{12} = \frac{2I_{xx} C_r}{I_{xx} m V_x - m_s^2 h_s^2 V_x}$$

$$b_{21} = \frac{2C_f l_f}{I_{zz}}, \quad b_{22} = -\frac{2C_r l_r}{I_{zz}}$$

$$b_{41} = \frac{2m_s h_s C_f}{m I_{xx} - m_s^2 h_s^2}$$

$$b_{42} = \frac{2m_s h_s C_r}{m I_{ss} - m_s^2 h_s^2}$$

$C_f$ indicates a front wheel cornering stiffness coefficient, and $C_r$ indicates a rear wheel cornering stiffness coefficient.

The processor 130 may store the calculated target yaw rate and the calculated target roll angle in the storage 120.

In the present disclosure, steering control may be divided into initial and later stages, and a first half and a second half of the control may be divided and controlled differently. Accordingly, the processor 130 may determine whether it is in an initial turning stage (initial stage of steering control). That is, the processor 130 may determine whether it is in the initial turning stage based on a vehicle speed, a road friction coefficient, an APS, a steering angular speed, and the like, and may set a gain of a PD controller for calculating the target yaw moment and the target roll moment to be suitable for the initial turning stage or the later turning stage. A configuration of the PD controller will be described in detail later with reference to FIG. 4.

The processor 130 may calculate a yaw rate error and a roll angle error based on the target yaw rate and the target roll angle as in Equations 7 and 8 below. That is, the processor 130 may calculate the yaw rate error by subtracting the sensor yaw rate from the target yaw rate as in Equation 7. In this case, the target yaw rate may be a value obtained through Equation 2, and the sensor yaw rate may be a value received from the sensing device 200.

Yaw rate error($e_r$)

=target yaw rate($r$)−sensor yaw rate  (Equation 7)

The processor 130 calculates the roll angle error by subtracting an estimated roll angle from the target roll angle as in Equation 8. In this case, the target roll angle may be a value obtained through Equation 2, and the estimated roll angle may be a value obtained from Equation 1.

Roll angle error($e_Φ$)

=Target roll angle(Φ)−Estimated roll angle(Φ)  Equation 8

The processor 130 may calculate a target yaw moment Mz and a target roll moment Mx by using the yaw rate error and the roll angle error obtained in Equations 7 and 8.

Figure 4:
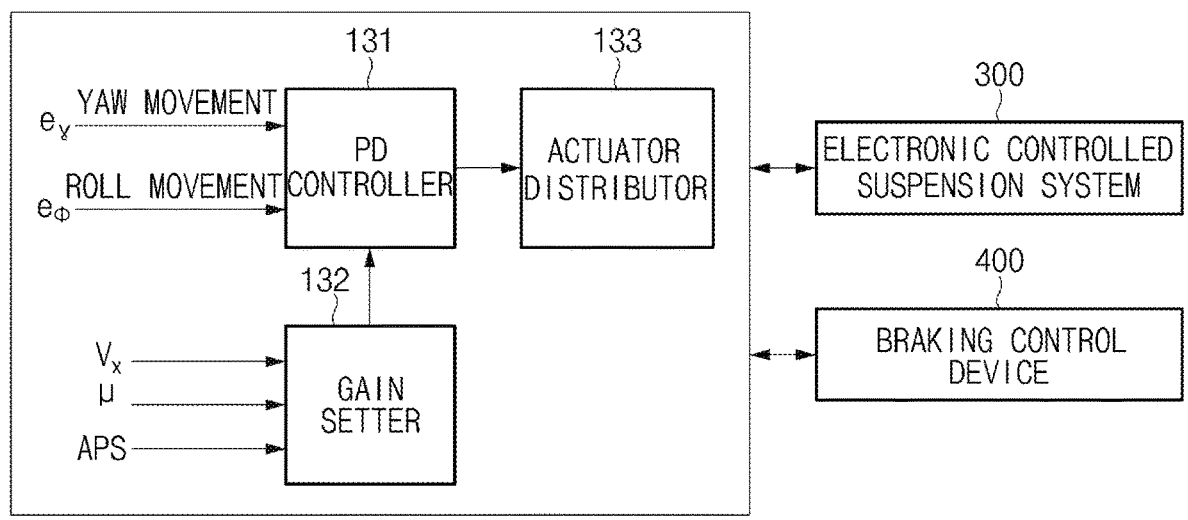
FIG. 4 illustrates a view for describing a control amount calculation method of an integrated control apparatus for a vehicle according to an exemplary embodiment of the present disclosure.

FIG. 4 illustrates a configuration of a PD controller 131, a gain setter 132, and an actuator distributor 133 for calculating a target yaw moment Mz and a target roll moment Mx as a portion of a detailed configuration of the processor 130.

When a yaw rate error $e_r$ and a roll angle error $e_φ$ are received, the PD controller 131 may respectively calculate the target yaw moment Mz and the target roll moment Mx depending on a preset gain. The PD controller 131 is a proportional-derivative controller, and a configuration that calculates the target yaw moment Mz and the target roll moment Mx by using the yaw rate error $e_r$ and the roll angle error $e_φ$ may be used by a conventional technique.

The gain setter 132 sets the gain of the PD controller 131 in consideration of a vehicle speed, a road friction coefficient, a driver acceleration pedal opening degree (APS), and a steering angle speed.

The actuator distributor 133 converts and distributes the target yaw moment Mz and the target roll moment Mx calculated from the PD controller 131.

The actuator distributor 133 converts the target yaw moment Mz into a tire force value $F_{b,rear}$ as shown in Equation 10, and converts the tire force to the target braking pressure $P_{br}$, as shown in Equation 11.

$$F_{b,rear} = \frac{2M_z}{T_r} \qquad \text{(Equation 10)}$$

In this case, $T_r$ indicates a same radius of the tire.

$$P_{br} = \frac{F_{b,rear} r_{eff}}{K_{br}} \qquad \text{(Equation 11)}$$

In this case, $r_{eff}$ indicates an effective brake diameter, and $K_{br}$ indicates a coefficient that converts brake hydraulic pressure into wheel torque with a brake factor.

Figure 5:
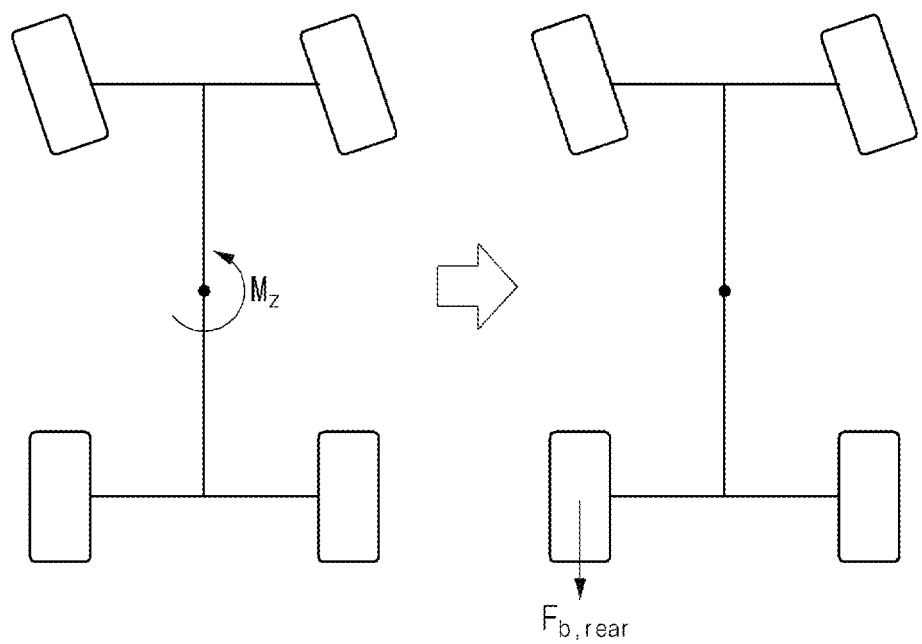
FIG. 5 illustrates a view for describing a method for calculating a control amount of a braking control device according to an exemplary embodiment of the present disclosure.

FIG. 5 illustrates a view for describing a method for calculating a control amount of a braking control device according to an exemplary embodiment of the present disclosure. Referring to FIG. 5, it can be seen that the target yaw moment Mz is converted to the tire force value $F_{b,rear}$.

Therefore, the processor 130 outputs a target braking pressure $P_{br}$ as a braking command of the braking control device (ESC) 400, and applies breaking of a turning inner wheel.

Figure 6:
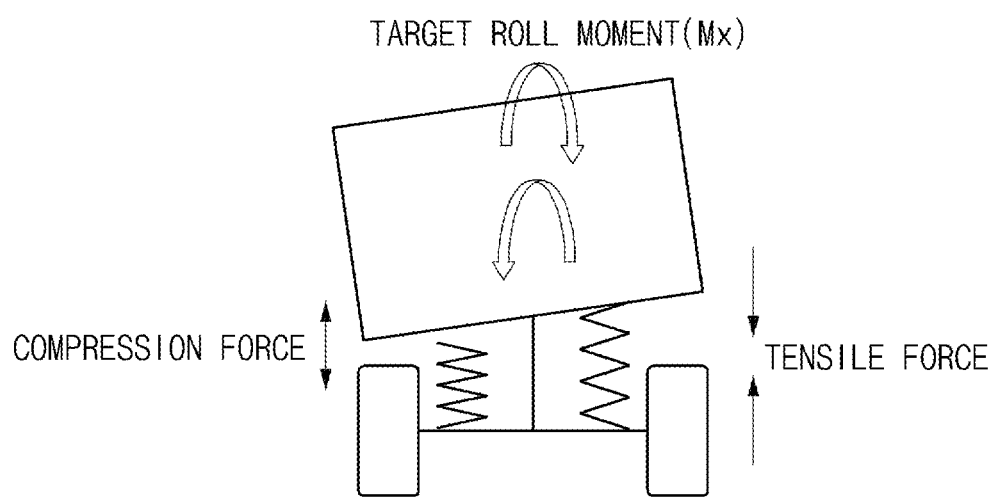
FIG. 6 illustrates a view for describing a method for calculating a control amount of an electronic controlled suspension system according to an exemplary embodiment of the present disclosure.

In addition, the actuator distributor 133 may convert the target roll moment $M_x$ calculated as in Equation 12 into a damping force. That is, the actuator distributor 133 may convert the target roll moment into a damping force, which is a required vertical force (a compression force or a tensile force) of each wheel $F_{FL}$, $F_{FR}$, FRL, and $F_{RR}$ as shown in FIG. 6. FIG. 6 illustrates a view for describing a method for calculating a control amount of an electronic controlled suspension system according to an exemplary embodiment of the present disclosure.

$$F_{FL} = \frac{M_x}{\text{Tread}/2} \times \text{Front wheel distribution} \qquad \text{(Equation 12)}$$
$$\text{ratio} \times \text{Left and right distribution ratio}$$

$$F_{FR} = \frac{M_x}{\text{Tread}/2} \times \text{Front wheel distribution}$$
$$\text{ratio} \times \text{Left and right distribution ratio}$$

$$F_{RL} = \frac{M_x}{\text{Tread}/2} \times \text{Rear wheel distribution}$$
$$\text{ratio} \times \text{Left and right distribution ratio}$$

$$F_{RR} = \frac{M_x}{\text{Tread}/2} \times \text{Rear wheel distribution}$$
$$\text{ratio} \times \text{Left and right distribution ratio}$$

In this case, Tread indicates a distance between centers of wheels, and indicates a distance between a left wheel and a right wheel. In this case, a front wheel distribution ratio and a left and right distribution ratio may be set in consideration of a limitation of an actuator.

The processor 130 may control a phase difference between the yaw rate and the roll angle when controlling the braking control and the electronic controlled suspension. In addition, the processor 130 may perform braking control to be performed during a period in which a yaw rate is generated and increased in an initial stage of steering control of the vehicle, and may control the braking control to be ended in a later stage of steering control.

The processor 130 may control a damping force of a first stage to be outputted before the roll angle occurs in the initial stage of steering control of the vehicle, may control a damping force of a second stage that is larger than the first stage to be outputted at a time point at which a change amount of the roll angle decreases after the roll angle increases, and may release damping control when the roll rate disappears.

The processor 130 may control the yaw rate by performing eccentric braking on the turning inner rear wheel in the initial stage of steering control of the vehicle, may softly control the damping force for damping control, and may release the eccentric braking in the later stage of steering control of the vehicle to hardly control the damping force.

The sensing device 200 may include a plurality of sensors for sensing a wheel slip, a vehicle speed, a yaw rate, a roll angle, a steering angle, a steering angle speed, and the like, and to this end, may include an acceleration sensor, a yaw rate sensor, a torque measurement sensor and/or a wheel speed sensor, a steering angle sensor, and the like.

The electronic controlled suspension system (ECS) 300 serves to ensure driving safety and riding comfort by changing a height of a vehicle body depending on a road surface condition and a driving condition. The electronic controlled suspension system 300 may be controlled depending on a damping control amount received from the integrated control apparatus 100.

The braking control device 400 may be configured to control braking of the vehicle, and may include a controller that controls a brake thereof. The braking control device 400 may perform braking depending on a braking control amount received from the integrated control apparatus 100. The braking control device 400 may include an electronic stability control (ESC) device.

As described above, the present disclosure improves the responsibility of the yaw rate through the eccentric braking of the turning outer rear wheel in the initial stage of steering control of the driver, and softly maintains the electronic controlled suspension to control the responsibility of the roll to be linked to the responsibility of the yaw rate. In addition, the present disclosure prevents an overshoot of the yaw rate when the eccentric braking is ended in the second half of the steering control, and at the same time, the electronic controlled suspension is maintained to be hard to remove the overshoot of the roll and to stabilize the behavior of the vehicle. According to the present disclosure, it is possible to improve steering unity and vehicle behavior linearity by reducing a time delay for yaw and roll behaviors of the vehicle through such control, compared to steering control of a driver.

Hereinafter, an integrated control method for a vehicle according to an exemplary embodiment of the present disclosure will be described in detail with reference to FIG. 7 and FIG. 8. Hereinafter, it is assumed that the integrated control apparatus 100 of FIG. 1 performs the processes of FIG. 7 and FIG. 8. In addition, in the description of FIG. 7 and FIG. 8, operations described as being performed by the device may be understood as being controlled by the processor 130 of the integrated control apparatus 100 for the vehicle.

Figure 7:
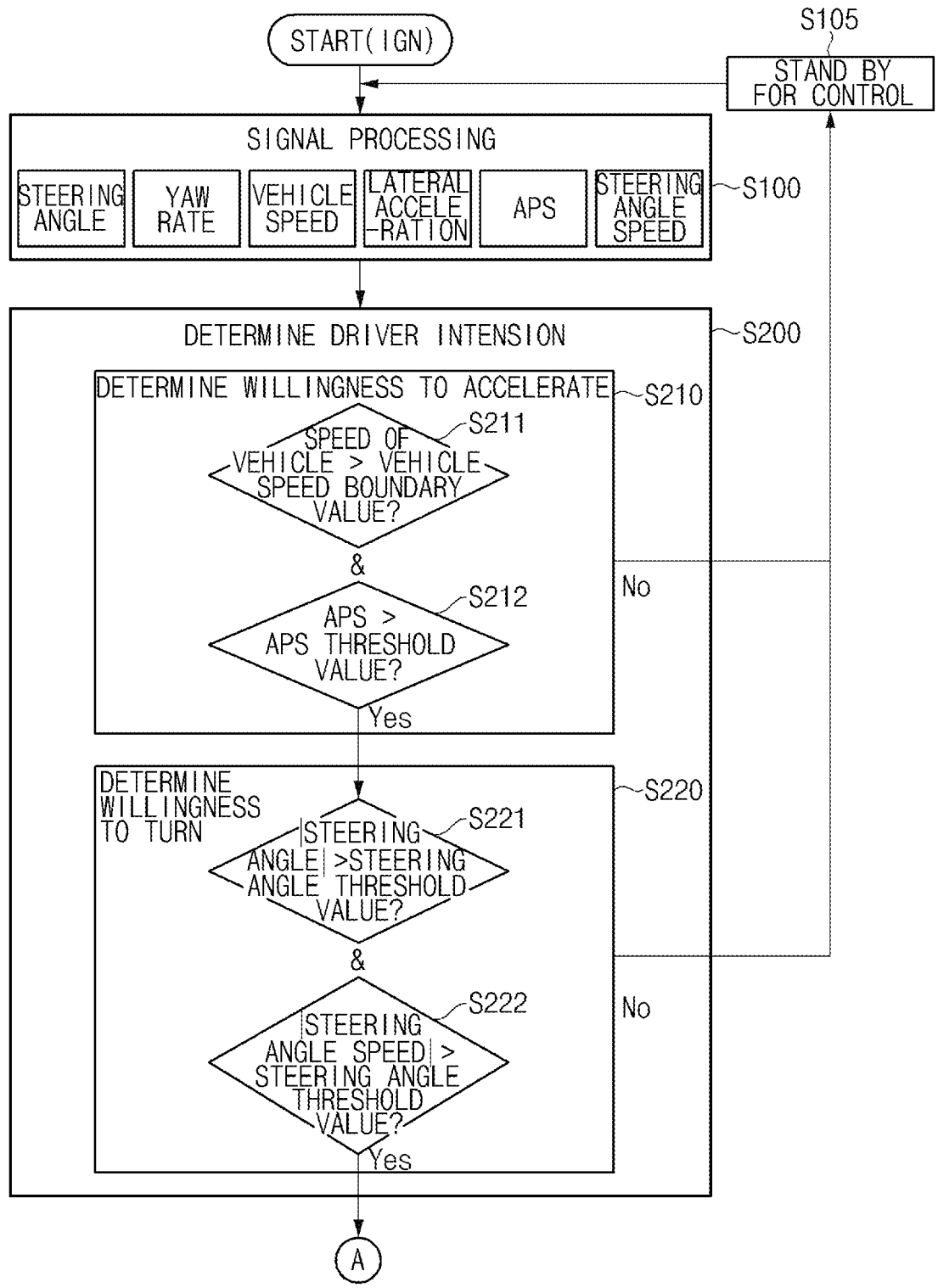
FIG. 7 and FIG. 8 illustrate flowcharts showing an integrated control method for a vehicle according to an exemplary embodiment of the present disclosure.

Referring to FIG. 7, the integrated control apparatus 100 receives sensing signals through CAN communication from the sensing device 200 to perform signal processing (S100). In this case, the sensing signals may include a steering angle, a yaw rate, a vehicle speed, a lateral acceleration, an APS, a steering angular speed, and the like. In addition, the integrated control apparatus 100 may perform signal processing to extract maximum and minimum values of the sensing signals and remove noise through a LPF (1st low pass filter).

The integrated control apparatus 100 may determine an intention of a driver to turn (S200).

That is, the integrated control apparatus 100 may determine a willingness of the driver to accelerate based on the vehicle speed and the APS (accelerator pedal opening value) (S210), and may determine a willingness to turn based on the steering angle and the steering angle speed (S220).

The integrated control apparatus 100 may determine whether the vehicle speed is greater than a predetermined vehicle speed boundary value, and may determine that the driver has the willingness to accelerate when the vehicle speed is greater than the predetermined vehicle speed boundary value (S211). In addition, the integrated control apparatus 100 may determine whether the APS is greater than a predetermined APS boundary value, and may determine that the driver has the willingness to accelerate when the APS is greater than a predetermined APS boundary value (S212). When the vehicle speed is equal to or less than the predetermined vehicle speed threshold value, or when the APS is equal to or less than the predetermined APS threshold value, the integrated control apparatus 100 determines that the driver has no willingness to accelerate and stands by for control (S105).

In this case, the integrated control apparatus 100 may determine that the driver maintains or accelerates a speed of the vehicle when both the vehicle speed and the APS satisfy a certain condition, and it is possible to prevent a sense of difference of braking caused by braking control at a low speed by setting the vehicle speed condition as described above.

The integrated control apparatus 100 may determine whether the steering angle is greater than a predetermined steering angle boundary value, and may determine that the driver has the willingness to turn when the steering angle is greater than the predetermined steering angle boundary value (S221). In addition, the integrated control apparatus 100 may determine whether the steering angle speed is greater than a predetermined steering angle speed boundary value, and may determine that the driver has the willingness to turn when the steering angle speed is greater than the predetermined steering angle speed boundary value (S222). When the steering angle is equal to or less than the predetermined steering angle threshold value, or when the steering angle speed is equal to or less than the predetermined steering angle speed threshold value, the integrated control apparatus 100 determines that the driver has no willingness to turn and stands by for control (S105).

The integrated control apparatus 100 may determine that the driver is willing to turn when both the steering angle and the steering angle speed satisfy predetermined conditions.

Figure 8:
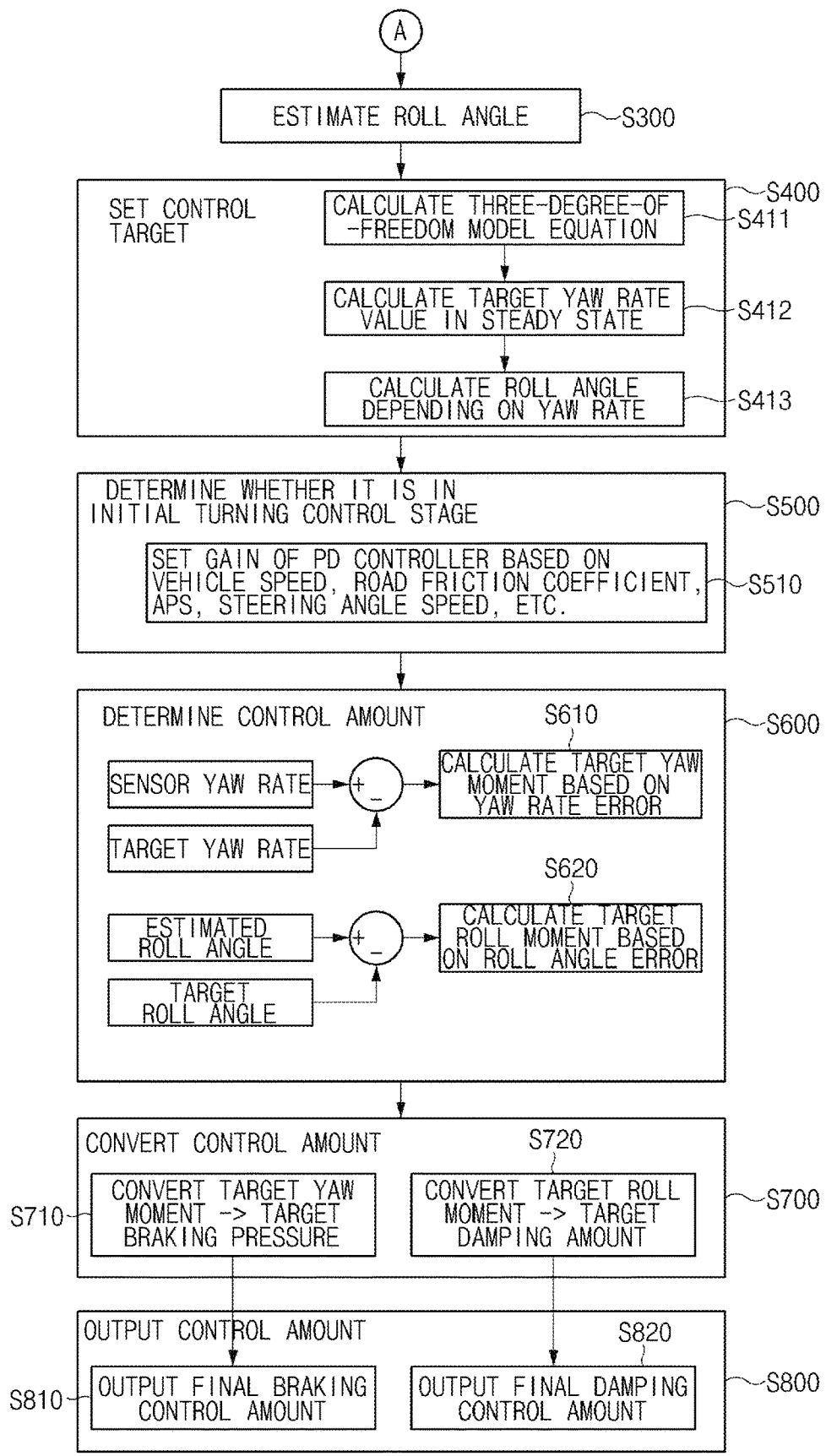

Referring to FIG. 8, when it is determined in step S200 that the driver intends to turn, the integrated control apparatus 100 performs roll angle estimation based on a lateral acceleration sensing signal (S300).

The integrated control apparatus 100 may set a control target (S400).

The integrated control apparatus 100 calculates a three-degree-of-freedom model equation as in Equation 1 above (S411), derives Equation 2 from Equation 1 to calculate a target yaw rate value in a steady state (S412), and calculates a target roll angle in a steady state (S413).

Subsequently, the vehicle integrated control apparatus 100 determines whether it is in an initial turning stage (S500). That is, the integrated control apparatus 100 sets the gain of the PD controller based on the vehicle speed, the road friction coefficient, the APS, the steering angle speed, etc. (S510).

The integrated control apparatus 100 may set a control amount (S600).

That is, the integrated control apparatus 100 calculates a target yaw moment based on a yaw rate error using a sensor yaw rate and a target yaw rate (S610), and calculates a target roll moment based on a roll angle error by using an estimated roll angle and a target roll angle (S620). In this case, the target yaw moment and the target roll moment may be calculated through the PD controller.

The integrated control apparatus 100 may convert a control amount (S700).

The integrated control apparatus 100 converts the calculated target yaw moment into a target braking pressure (S710), and converts the calculated target roll moment into a target damping amount (S720), to output a final control amount and a final damping control amount (S800). That is, the integrated control apparatus 100 outputs the converted target braking pressure as the final braking control amount, and outputs the target damping amount as the final damping control amount (S810 and S820).

As such, the present disclosure distinguishes steering control into initial and later stages, controls the yaw rate by performing eccentric braking on the turning inner rear wheel in the initial stage of steering control, and controls an ECS damping force as a first stage (soft area). On the other hand, the present disclosure releases the braking control in the later stage of steering control, and controls the ECS damping force as a second stage (hard area).

As described above, as the brake control and the suspension control are integrally controlled to improve the roll responsibility and the yaw rate to the steering control input of the driver by distinguishing the steering control into the initial and later stages, the unity of the vehicle behavior of the driver may be improved by reducing the time delay for the yaw and roll behaviors compared to the driver's steering control, and agility of the vehicle behavior may be improved by increasing the linearity between the yaw rate and the roll.

Figure 9:
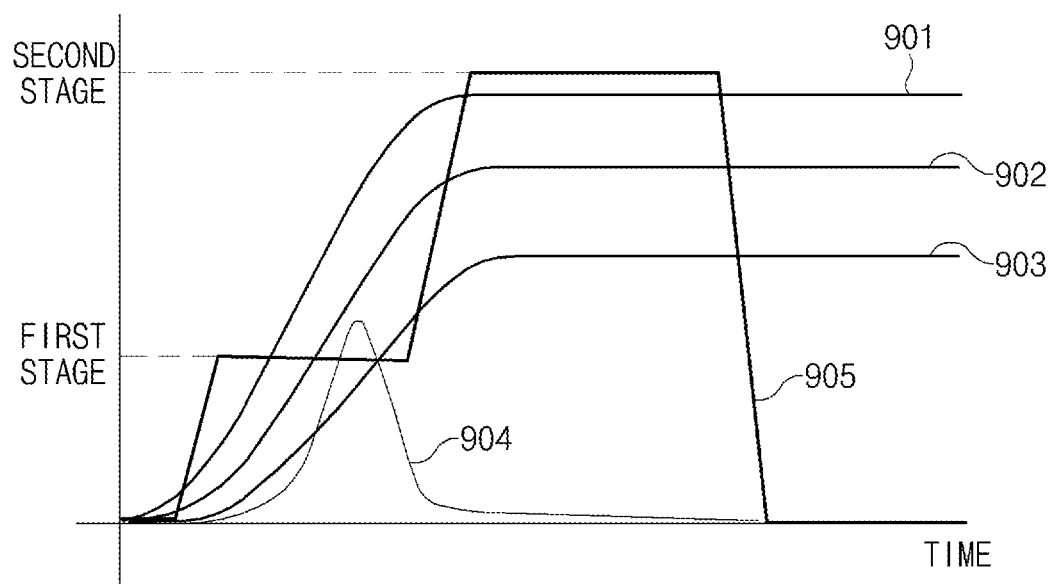
FIG. 9 illustrates a graph for describing an integrated control method for a vehicle according to an exemplary embodiment of the present disclosure.
Figure 10:
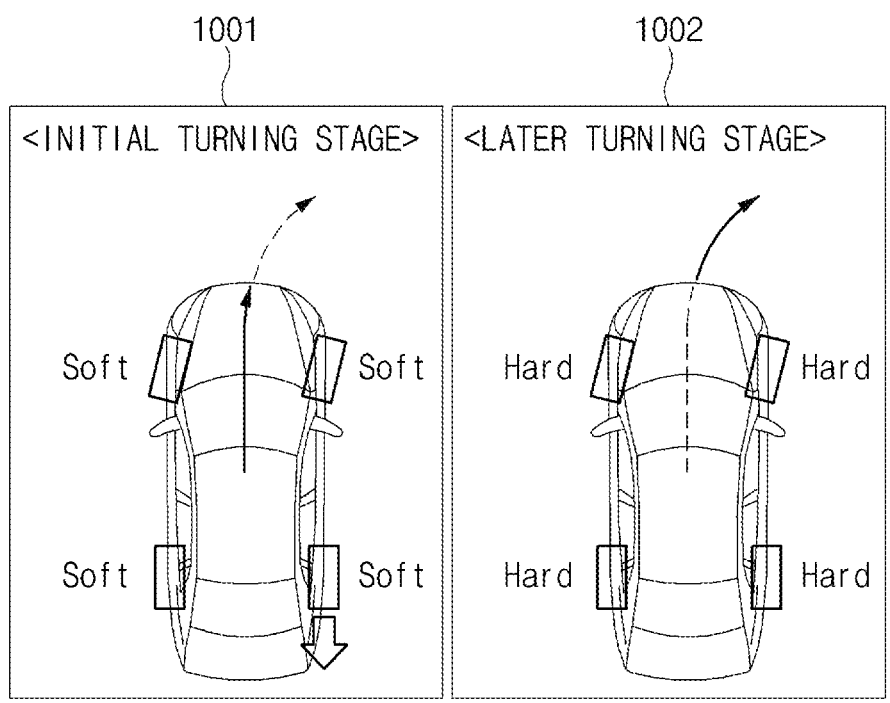
FIG. 10 illustrates a view for describing damper amount control in an initial turning stage and a later turning stage according to an exemplary embodiment of the present disclosure.

FIG. 9 illustrates a graph for describing an integrated control method for a vehicle according to an exemplary embodiment of the present disclosure, and FIG. 10 illustrates a view for describing damper amount control in an initial turning stage and a later turning stage according to an exemplary embodiment of the present disclosure.

Referring to FIG. 9, when a yaw rate 902 and a roll behavior 903 depending on a driver steering angle 901 occur, a braking control amount 4 and a damping control amount 905 controlled by the electronic controlled suspension system (ECS) 300 and the braking control device (ESC) 400 are displayed independently of respective physical amounts.

When the driver steering angle 901 is inputted, a vehicle behavior occurs, a yaw rate 902 is generated, followed by a roll behavior 903.

In this case, for a form and a control point of the final control amount to be calculated, it can be seen that a braking control 904 is performed during a period in which the yaw rate is built up, and the control is ended by reducing the braking pressure during the later turning stage.

In the case of damping control, as shown in a view 1001 in FIG. 10, it can be seen that a damping force is set to a first-stage control amount (soft damping) from before the roll angle occurs (at an occurrence time of steering angle), and the control is performed with a second-stage control amount (hard damping) at a time when the roll angle is built up and a change amount of the roll angle starts to decrease as shown in a view 1002 of FIG. 10. Thereafter, when the roll angle is in the steady state to allow the roll rate to disappear, damping control is released. Herein, each control amount in first and second stages may be determined by tuning.

Figure 11A:
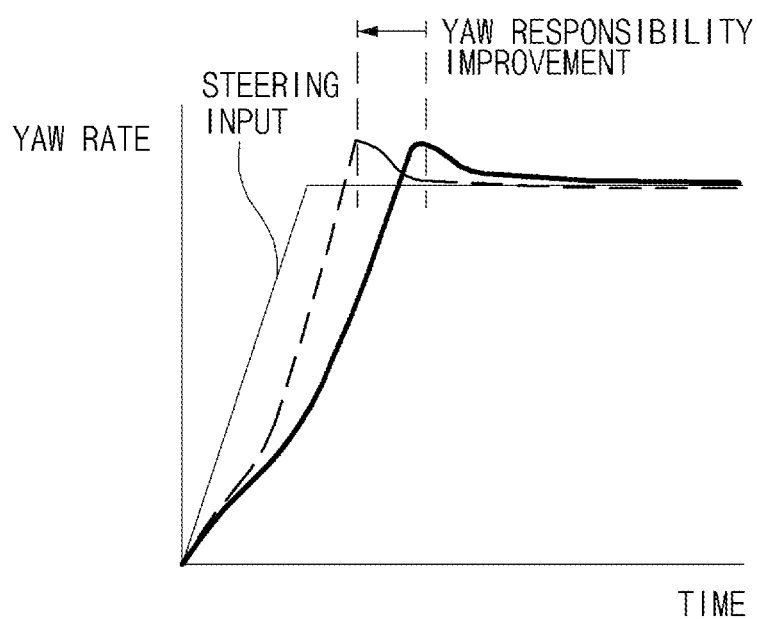
FIG. 11A and FIG. 11B illustrate graphs showing that yaw responsibility and roll responsibility are improved according to an exemplary embodiment of the present disclosure.
Figure 11B:
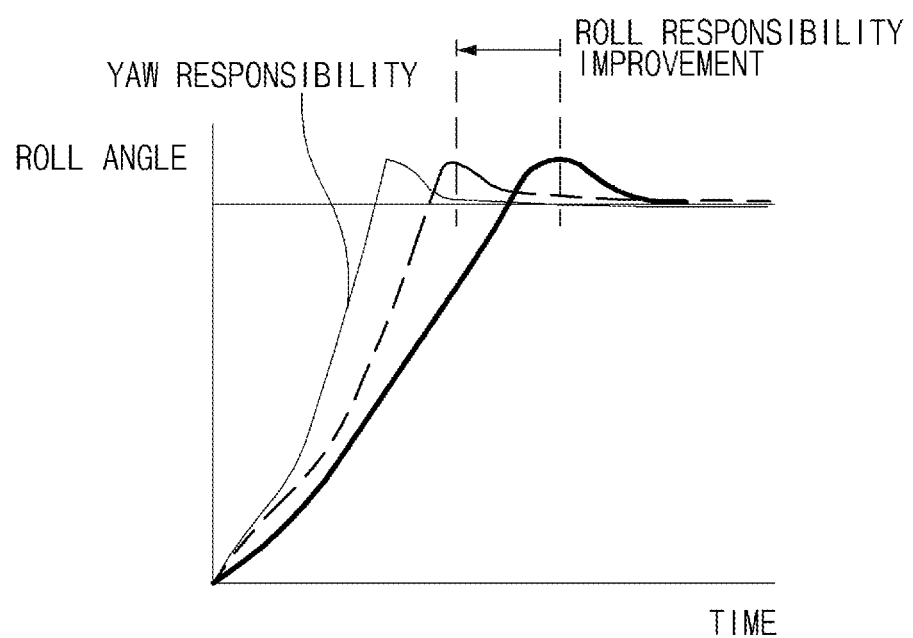

FIG. 11A and FIG. 11B illustrate graphs showing that yaw responsibility and roll responsibility are improved according to an exemplary embodiment of the present disclosure. FIG. 11A illustrates an example in which the yaw responsibility is improved, and FIG. 11B illustrates an example in which the roll responsibility is improved.

According to the present disclosure, it is possible to increase a sense of unity of the steering, the yaw rate, and the roll by utilizing the brake control device (ESC) and the electronic controlled suspension system (ECS) and by improving the yaw rate and roll responsibility depending on the steering input of the driver in terms of overall vehicle behavior.

As described above, the improvement of the yaw rate and the responsibility of the roll to the steering input of the driver may provide the driver with an improved sense of unity of a vehicle behavior, to improve linearity of the vehicle behavior by increasing the linearity between the yaw rate and the roll.

Figure 12:
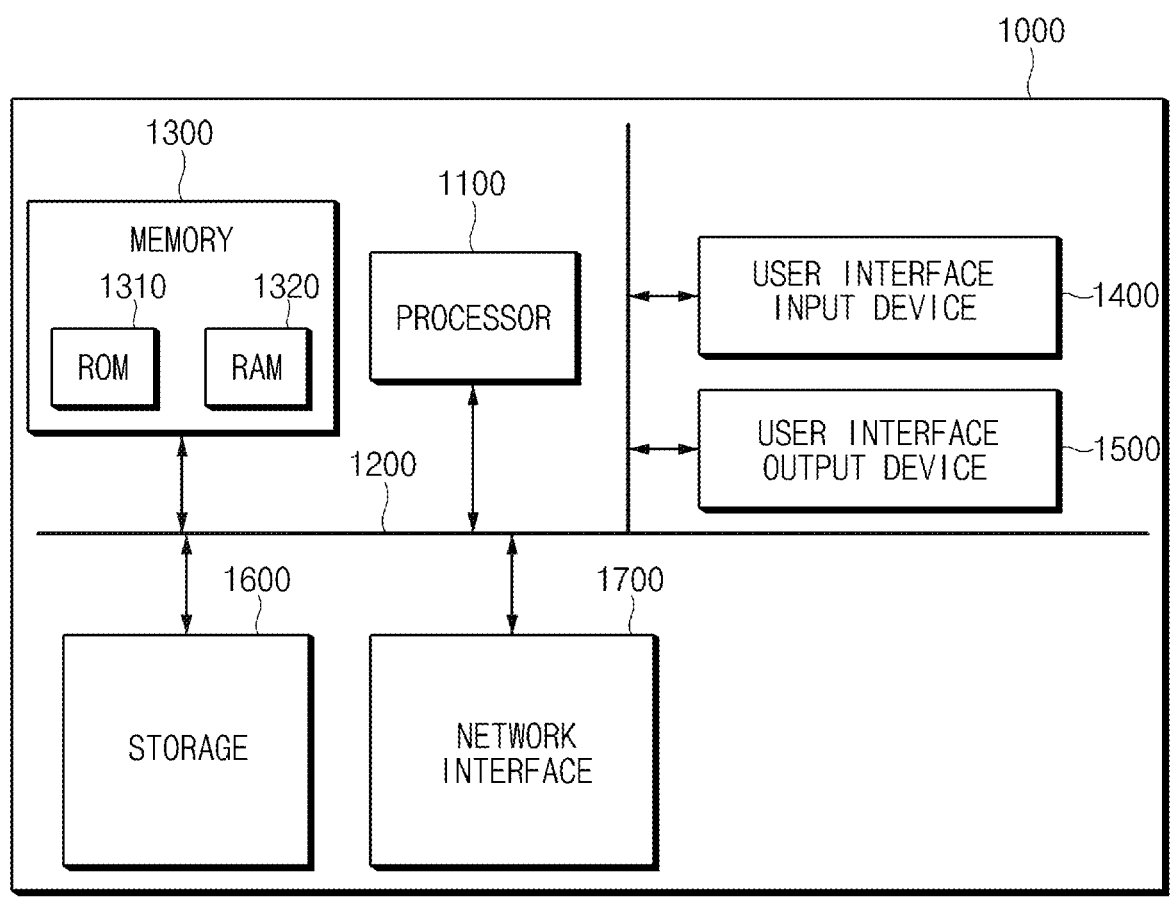
FIG. 12 illustrates a computing system according to an exemplary embodiment of the present disclosure.

FIG. 12 illustrates a computing system according to an exemplary embodiment of the present disclosure.

Referring to FIG. 12, the computing system 1000 includes at least one processor 1100 connected through a bus 1200, a memory 1300, a user interface input device 1400, a user interface output device 1500, and a storage 1600, or a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) and a random access memory (RAM).

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, a EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. An integrated control apparatus for a vehicle, comprising:
    a processor configured to perform braking control in an initial stage of steering control of a driver, to control a damping force of an electronic controlled suspension, to release the braking control in a later stage of steering control of the driver, and to increase the damping force of the electronic controlled suspension; and
    a storage configured to store data obtained by the processor and an algorithm for driving the processor,
    wherein the processor is further configured to:
    control a damping force of a first stage to be outputted before a roll angle occurs in the initial stage of steering control of the vehicle,
    control a damping force of a second stage that is larger than the first stage to be outputted at a time point at which a change amount of the roll angle decreases after the roll angle increases, and
    release damping control when a roll rate disappears.

2. The integrated control apparatus of claim 1, wherein the processor is further configured to
    control a phase difference between a yaw rate and a roll angle when controlling the braking control and the electronic controlled suspension.

3. The integrated control apparatus of claim 1, wherein the processor is further configured to
    estimate a roll angle of the vehicle based on a lateral acceleration of the vehicle and a mass of the vehicle.

4. The integrated control apparatus of claim 1, wherein the processor is further configured to
    calculate a target yaw rate and a target roll angle based on a three-degree-of-freedom vehicle model.

5. The integrated control apparatus of claim 4, wherein the processor is further configured to
    calculate a yaw rate error based on the target yaw rate and a sensed yaw rate.

6. The integrated control apparatus of claim 5, wherein the processor is further configured to
    calculate a roll angle error based on the target roll angle and an estimated roll angle.

7. The integrated control apparatus of claim 6, wherein the processor is further configured to:
    calculate a target yaw moment based on the yaw rate error, and
    calculate a target roll moment based on the roll angle error.

8. The integrated control apparatus of claim 7, wherein the processor is further configured to
    convert the target yaw moment into a target braking pressure, and convert the target roll moment into a target damping amount.

9. The integrated control apparatus of claim 8, wherein the processor is further configured to:
output the target braking pressure to a braking control device, and
output the target damping amount to an electronic controlled suspension system.

10. The integrated control apparatus of claim 8, wherein the processor is further configured to
convert the target yaw moment into a tire force, and convert the tire force into a target braking pressure.

11. The integrated control apparatus of claim 8, wherein the processor is further configured to
calculate a target damping force applied to each wheel of the vehicle by using at least one of a front wheel distribution ratio, a rear wheel distribution ratio, or a left and right distribution ratio.

12. The integrated control apparatus of claim 1, wherein the processor is further configured to
perform the braking control during a period in which a yaw rate is generated and increases in the initial stage of steering control of the vehicle, and control the braking control to be ended in the later stage of steering control.

13. The integrated control apparatus of claim 1, wherein the processor is further configured to:
control a yaw rate by performing eccentric braking on a turning inner rear wheel in the initial stage of steering control of the vehicle and control the damping force for damping control, and
release the eccentric braking in the later stage of steering control of the vehicle and increase the damping force.

14. The integrated control apparatus of claim 1, wherein the processor is further configured to:
determine a willingness of the driver to accelerate based on a vehicle speed and a driver accelerator pedal opening degree (APS), and
determine a willingness of the driver to turn based on a steering angle and a steering angle speed.

15. A vehicle system comprising:
a braking control device configured to control braking of a vehicle;
an electronic controlled suspension system configured to control a posture of a vehicle body; and
an integrated control apparatus configured to integrally control the braking control device and the electronic controlled suspension system,
wherein the integrated control apparatus
performs braking control in an initial stage of steering control of a driver, controls a damping force of an electronic controlled suspension, releases the braking control in a later stage of steering control of the driver, and increases the damping force of the electronic controlled suspension, and
wherein the integrated control apparatus is further configured to:
control a damping force of a first stage to be outputted before a roll angle occurs in the initial stage of steering control of the vehicle,
control a damping force of a second stage that is larger than the first stage to be outputted at a time point at which a change amount of the roll angle decreases after the roll angle increases, and
release damping control when a roll rate disappears.

16. An integrated control method for a vehicle, comprising:
performing braking control in an initial stage of steering control of a driver and controlling a damping force of an electronic controlled suspension; and
releasing the braking control in a later stage of steering control of the driver and increasing the damping force of the electronic controlled suspension,
wherein the controlling a damping force of an electronic controlled suspension comprises:
controlling a damping force of a first stage to be outputted before a roll angle occurs in the initial stage of steering control of the vehicle;
controlling a damping force of a second stage that is larger than the first stage to be outputted at a time point at which a change amount of the roll angle decreases after the roll angle increases; and
releasing damping control when a roll rate disappears.

17. The integrated control method of claim 16, further comprising:
estimating a roll angle of the vehicle based on a lateral acceleration of the vehicle and a mass of the vehicle;
calculating a target yaw rate and a target roll angle based on a three-degree-of-freedom vehicle model;
calculating a yaw rate error based on the target yaw rate and a sensed yaw rate; and
calculating a roll angle error based on the target roll angle and the estimated roll angle.

18. The integrated control method of claim 17, further comprising:
calculating a target yaw moment based on the yaw rate error;
calculating a target roll moment based on the roll angle error;
converting the target yaw moment into a target braking pressure; and
converting the target roll moment into a target damping amount.

19. The integrated control method of claim 18, further comprising
outputting the target braking pressure to a braking control device; and
outputting the target damping amount to an electronic controlled suspension system.

* * * * *